ELECTRONIC ORGAN

Filed July 9, 1956

Inventor
Richard H. Peterson
by Donald H. Sweet
Attorney 2,906,959

ELECTRONIC ORGAN

Richard H. Peterson, Oaklawn, Ill.

Application July 9, 1956, Serial No. 596,544

9 Claims. (Cl. 331—48)

Figures 1, 2:
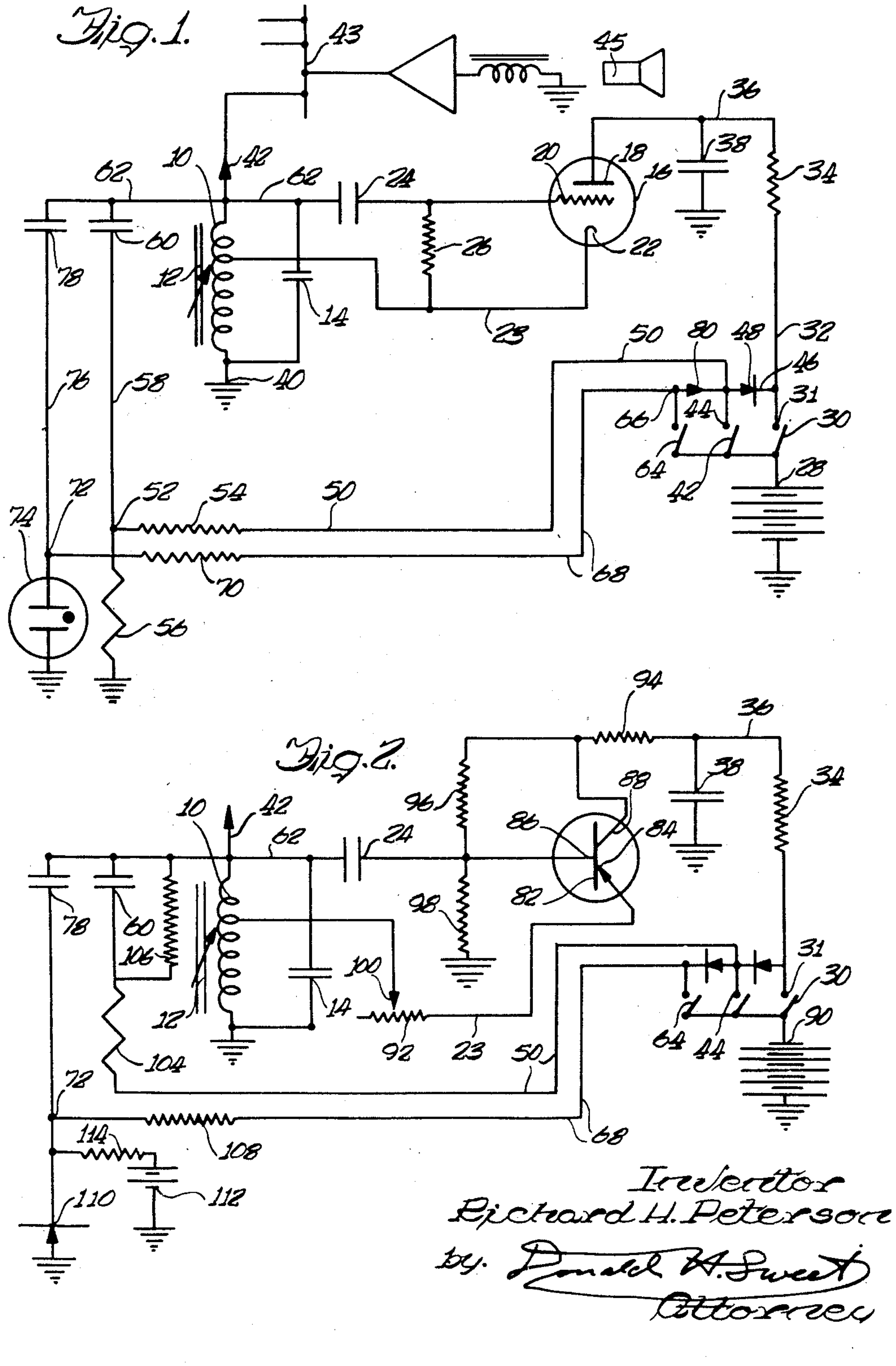

My invention relates to electronic organs and includes among its objects and advantages the use of an individual oscillating circuit to produce any one of a plurality of adjacent semitones without using special external switching arrangements. Where each oscillator only produces two adjacent semitones a complete tone generating chassis for producing 72 consecutive semitones requires only 36 oscillators. Suggested methods for reducing the number of oscillators necessary to produce all the semitones within the gamut of a complete organ, are substantially as old as the electronic organ, but for about thirty years there has been no general adoption or use of them. This is because the complications resulting from the use of switching arrangements external to the oscillators are so great that they preempt the available instrumentalities for standard couplers or multi-manual organs.

With a unitary oscillator in which the means for producing both semitones are built into the oscillator itself so that the unit presents two external terminals, one for each semitone, both adapted to receive D.C. potential from the same source, the same external connections can be used for a 36 oscillator chassis as for a chassis containing 72 separate oscillators. To produce such an oscillator is the chief object of the invention.

In the accompanying drawing:

Figure 1 is a schematic diagram of a tone generating unit employing a vacuum tube; and Figure 2 is a schematic diagram of a transistor oscillator similarly controlled.

In the embodiment selected to illustrate the invention the oscillator is of the Hartley type. The primary tuned loop includes the inductance winding 10 which may have a ferro-magnetic core 12 and be generally as disclosed in my copending patent application Serial Number 598,582, filed July 18, 1956.

It exchanges energy in the conventional way with the capacitor 14, and the entire loop is stimulated into continued oscillation by an exciting circuit. The exciting circuit includes the vacuum tube 16 having a plate 18, grid 20, and cathode 22. About 30% of the winding 10 is in the exciter circuit, which circuit includes capacitor 24 and the bias resistor 26.

In use, cathode 22 is maintained continually active and the playing of the music is accomplished by connecting the plate 18 to a source of potential to sound a note and discontinuing the energy supplied to the plate to stop the note.

From the source 28, positive potential is delivered under the control of the playing key 30 through contact 31, conductor 32, resistor 34, and conductor 36 to plate 18. Conductor 36 is grounded through capacitor 38. Resistor 34 and capacitor 38 constitute a time-delay circuit controlling the rate of attack at the time the note starts. When the key 30 is opened, the charge on capacitor 38 continues to supply potential to the plate 18 until the charge has been dissipated through the tube and the lower 70% of the coil 10 to ground at 40. This capacitor determines the rate of decay of the sound when the key is opened. The decay continues down to the point where the potential on the plate 18 becomes inadequate and oscillation ends.

As described in U.S. Patent Number 2,649,006 the output signal at 42 may be collected on any selected one 43 of a plurality of buses and delivered to a conventional loud speaker 45.

In addition to the playing key 30 I have indicated a playing key 42 connected to the same source of potential. The key 42 is adapted to deliver potential to a contact 44 across connected by a conductor 46 to the conductor 32. In the conductor 46 is interpolated a rectifier 48 connected so that potential can be delivered through contact 44 to conductor 32 but not vice versa. From the contact 44 a conductor 50 delivers potential to the junction point 52 through a control resistor 54. The junction 52 is connected to ground through a non-polar variable voltage-sensitive resistor 56, commonly called a varister. It is also connected through conductor 58 and capacitor 60 to conductor 62 and the output connection at 42.

The resistor 56 is of a type well-known in art and has the peculiar characteristic of having a pre-determined high resistance when no current is flowing through it. But when a sufficient potential difference is delivered, the flow of current causes the resistor to lower its resistance instantaneously to values as low as $\frac{1}{100}$ or $\frac{1}{1000}$ of its initial resistance.

It will be obvious when the key 42 is open the variable resistor 56 may have an extremely high resistance such as one megohm. Under such conditions the capacitor 60 is substantially ungrounded and inoperative. The delivery of a small D.C. current through the resistor 56 reduces this resistance so that capacitor 60 is effective to act in parallel with capacitor 14 and the increased capacity lowers the frequency of the oscillator by a predetermined amount such as one semitone.

To the left of the playing key 42 I have indicated a third playing key 64 connected through contact 66 conductor 68 and resistor 70 to junction point 72 which is grounded through a neon tube 74 and connected through conductor 76 and capacitor 78 to conductor 62. Between contacts 66 and 44 I provide a second rectifier 80 oriented in the same sense as rectifier 48. It will be obvious that if key 64 is closed by the organist both capacitor 60 and capacitor 78 will be inserted in parallel with the capacitor 14 and a still greater lowering in pitch will result.

Referring now to Figure 2, the transistor base 82 is connected in the common emitter relationship, with the conductor 23 leading to the emitter 84 and the capacitor 24 connected to the base at 86 and the collector 88 receiving negative potential from the power source 90. Considered as a triode, the transistor base 86 corresponds to the grid 20 of Figure 1; the collector 88 corresponds to the plate 18; and the emitter 84 corresponds to the cathode 22, but the direction of current flow is reversed. Therefore, the diodes 48 and 80 act in opposite directions in the two figures, and key 30 is connected to the positive terminal of source 28, but to the negative terminal of source 90.

Except for the tuned circuit, all the resistors and capacitors need to have different absolute values because currently available transistors operate best at voltages between about 6 and about 18. With the transistor and wiring illustrated the resistor 26 is omitted. The adjustable resistance 92 in series with the emitter prevents injury by a runaway, and the working potential of the base and collector are controlled by a three element network comprising a first resistor 94 above the collector 88, a second resistor 96 between the collector 88 and the base 86, and a third resistor 98 between the base 88 and ground. The adjustable connection 100 to the resistor 92 enables the user to compensate for quality variations in the transistor element proper, so that transistors can be changed or replaced and the operating characteristics of the entire oscillator kept substantially unaltered.

In Figure 2 the key 44 and conductor 50 lead direct to a voltage-sensitive resistor 104 connected to the first detuning capacitor 60 with a resistor 106 in shunt with the capacitor. In this embodiment the current for reducing the value of the resistor 104 is not direct to ground but passes through the coil 10 and then to ground. The slight variation in the direct current in coil 10 resulting from this relationship has a desirable action in decreasing the incremental permeability of the core 12.

The key 64 and conductor 68 are connected through an ordinary resistor 108 of high value to junction point 72 which is connected to ground through a rectifier 110. A small separate source of bias potential 112 is also connected through resistor 114 to the same junction point 72. The potential of source 112 must be well in excess of the maximum alternating potential of the signal so that when key 64 is open rectifier 110 is never conductive. The potential of the source 90 needs to exceed that of the source 112 by more than the maximum potential of the signal, so that when key 64 is closed the rectifier 110 is always conductive. These potential values are comfortably within the ordinary range of potentials employed in such apparatus.

In a complete organ having a pre-determined range of, say, 64 or 72 consecutive semitones, it is only necessary to have 32 or 36 oscillating circuits, respectively. The oscillating circuits are tuned to alternate semitones and each intervening semitone can be produced by using for that semitone the key 42 of Figure 1. This does make it impossible for the organist to play one note and another note only one semitone removed from it, in half the combinations within the range of the organ. However, the simultaneous playing of two notes only a semitone apart is so inharmonious that it practically never occurs in ordinary music, and therefore all the combinations the organist wants to play will be available without complications.

It will be apparent that the use of electronic means for rendering capacitors 60 and/or 78 operative or inoperative secures a unitary oscillator presenting at least two external terminals, with each terminal automatically producing its pre-determined frequency upon receipt of the same D.C. activating potential from the same source. Such electronic control means may include the voltage-sensitive resistors 56 and 104; the neon tube 74, the rectifier 110, or simply another vacuum triode. Because the terminals 44 and 31 function identically with the corresponding terminals of a chassis provided with twice as many oscillators, the smaller chassis becomes the full equivalent of the single oscillator chassis, so far as its incorporation into the rest of the complete organ is concerned.

Others may readily adapt the invention for use under various conditions of service by employing one or more of the novel features disclosed, or equivalents thereof. As at present advised with respect to the apparent scope of my invention I desire to claim the following subject matter.

I claim:

1. In an electronic organ, in combination: a multiple pitch oscillator comprising a transistor; said transistor having a base, an emitter, and a collector, a tuned loop comprising an inductance and a capacitor connected across the terminals of said inductance; a ground connection at one end of said inductance; an exciting circuit comprising a base conductor from the base of said transistor connected through a capacitor to said inductance; a conductor leading from the emitter through a first adjustment resistor to a different point in said inductance; said exciting circuit spanning only about 30% of said inductance; an adjustment resistor in said exciting circuit connected in series with said emitter; manual adjustment means for adjusting the value of said first adjustment resistor; a source of potential; player-controlled key means for delivering potential to the collector of said transistor; a second resistor connected between said collector and said base; and a third resistor connected between said base and ground; whereby said three last-mentioned resistors operate to control the working potentials of said collector and base.

2. An oscillating circuit comprising, in combination: an inductor having a winding; a capacitor interconnected therewith to exchange pulsating energy; an exciting circuit having a portion in common with a minor portion of said inductor; said exciting circuit including a first conductor leading from a predetermined point in said inductor winding; a capacitor having one terminal connected to said conductor; a transistor having a base and an emitter and a collector; a second conductor connecting the other terminal of said capacitor to the base of said transistor; a third conductor connected to a different point on said inductor winding; a variable resistor connected to said third conductor; manual adjustment means for adjusting the value of said variable resistor; a conductor connecting said variable resistor to the emitter of said transistor; a source of activating potential; a second resistor connected to said source; a connection from said second resistor to the collector of said transistor; a third resistor connected between the collector and the base of said transistor and a fourth resistor connected between the base of said transistor and the positive terminal of said potential source.

3. An electronic organ comprising, in combination: a plurality of independent audio-frequency oscillators each oscillator having the frequency of a desired musical note to be produced; each oscillator comprising a transistor; said transistor having a base, an emitter, and a collector; a tuned loop comprising an inductance, and a capacitor connected across the terminals of said inductance; a ground connection at one end of said inductance; an exciting circuit comprising a first, base conductor from said base to said inductance at a first point remote from said ground connection; said base conductor having a blocking capacitor interposed between said base and said inductance; a second, emitter conductor leading from said emitter to a second, different point in said inductance; said second point being separated from said ground connection and from said base conductor; said second, emitter conductor having an adjustment resistor interposed in it between said emitter and said inductance; a source of potential; a player-controlled key-switch means for delivering source potential to said oscillator; and a biasing resistor connected between said emitter and said base; collector bus means for merging the oscillations from all said oscillators; and loud speaker means for translating the composite merged oscillation into acoustical sound waves.

4. A combination according to claim 3 in which said player-controlled means is a key switch carrying constant source potential; a resistor connected to receive potential from said key switch; a time-delay capacitor in series with said resistor and connected to ground; whereby the potential at any intermediate point in the connector between said resistor and capacitor has a predetermined time-potential or attack curve; and a connection from said intermediate point to said collector; said time-delay capacitor discharging through said oscillator when said key switch is moved to open position, whereby the energy stored in said time-delay capacitor is available at decreasing voltages to prolong the decay of the oscillation after the key switch has been opened.

5. An audio-frequency oscillator comprising, in combination: an inductor having a winding; a first, tank capacitor interconnected therewith to exchange pulsating energy; a transistor having a base and an emitter and a collector; an exciting circuit having a portion in common with a portion of said inductor winding; said exciting circuit including a first, base conductor leading from a predetermined point in said inductor winding to said transistor base; a second, blocking capacitor interposed in said base conductor between said base and said inductor; a second, emitter conductor leading from a different predetermined point in said conductor winding to said emitter; a first, adjustment resistor interposed in said second, emitter conductor between said inductor winding and said emitter; a source of activating potential; key switch means for delivering activating potential from said source to said collector; and a second, biasing resistor connected between said collector and said base; one of said first and second conductors being connected to one end of said inductor winding.

6. An audio-frequency oscillator according to claim 5, including a third resistor connected from said transistor base to the end of said inductor winding remote from both said first and second conductors.

7. An audio-frequency oscillator according to claim 6 in which said third resistor and said inductor winding are both connected to ground potential.

8. An audio-frequency oscillator according to claim 5 in combination with a time-delay circuit interposed between said key switch means and said collector, to receive constant full source voltage from said source, and deliver to said oscillator, beginning at the instant said key switch closes, a voltage increasing gradually over a short period of time up to source voltage; said time period being approximately the attack period of the tone emanating from a musical instrument.

9. An audio-frequency oscillator according to claim 5 in combination with manual adjustment means accessible to the user for changing the resistance of said first, adjustment resistor, to compensate for differences in transistor characteristics when replacing a transistor.

References Cited in the file of this patent

UNITED STATES PATENTS

| | | |
|---|---|---|
| 2,216,513 | Hammond | Oct. 1, 1940 |
| 2,401,372 | Rienstra | June 4, 1946 |
| 2,483,823 | George | Oct. 4, 1949 |
| 2,649,006 | Heytow et al. | Aug. 18, 1953 |
| 2,790,906 | Hammond | Apr. 30, 1957 |
| 2,806,954 | Tennes | Sept. 17, 1957 |